United States Patent [19]

Thompson

[11] Patent Number: 4,860,500
[45] Date of Patent: Aug. 29, 1989

[54] PASSIVE ACTUATOR TO MAINTAIN A CONSTANT NORMAL CUTTING FORCE DURING ROBOTIC DEBURRING

[75] Inventor: Robert A. Thompson, Quaker Street, N.Y.

[73] Assignee: General Electric Company, Schenectady, N.Y.

[21] Appl. No.: 90,176

[22] Filed: Aug. 27, 1987

[51] Int. Cl.⁴ .............................................. B24B 41/00
[52] U.S. Cl. .............................. 51/165.77; 51/165.85; 51/165.93; 51/34 D; 51/72 R; 409/138
[58] Field of Search ............ 51/165 R, 165.71, 165.9, 51/165.77, 165.85, 165.93, 165.76, 72 R, 34 D; 409/138–140; 408/9–15; 901/41, 36, 37, 27, 28, 29, 22

[56] References Cited

U.S. PATENT DOCUMENTS

| | | |
|---|---|---|
| 3,482,361 | 12/1969 | Price et al. |
| 3,634,976 | 1/1972 | Hahn et al. ........................ 51/165.9 |
| 3,898,771 | 8/1975 | Kuniholm . |
| 4,062,151 | 12/1977 | Hjalmarson . |
| 4,229,908 | 10/1980 | Panzeri . |
| 4,289,441 | 9/1981 | Inaba et al. . |
| 4,523,409 | 6/1985 | Defazio ........................... 51/165.77 |

OTHER PUBLICATIONS

A Microprocessor-Based Control System for Robotic Deburring, by T. M. Stepien, Oct. 1984, General Electric, Class 1, Report No. 84CRD269.

Primary Examiner—Frederick R. Schmidt
Assistant Examiner—Maurina Rachuba
Attorney, Agent, or Firm—Donald R. Campbell; James C. Davis, Jr.; Paul R. Webb, II

[57] ABSTRACT

Precision control over the cutting force during robotic deburring and edge contouring is obtained by use of a "zero spring rate" driver. The driver consists of an air cylinder with a low friction piston. An accumulator is used in between an air supply line and the air cylinder such that the air pressure against the piston is constant. The driver is used to position or move a moving portion of an ultralow friction ball slide relative to a fixed portion of the ball slide. The arrangement avoids inaccuracies in a metal removal process which might otherwise be caused by robot path errors, part setup errors, and robot stepwise motion effects.

15 Claims, 3 Drawing Sheets

PASSIVE ACTUATOR TO MAINTAIN A CONSTANT NORMAL CUTTING FORCE DURING ROBOTIC DEBURRING

BACKGROUND OF THE INVENTION

This invention relates to a robotic device and, more specifically, a passive actuator for maintaining a deburring tool against a workpiece.

Robots have been used for the application of metal removal tools against workpieces. Robots offer a flexibility and ability to provide consistent quality which, together with economic incentives, makes their use quite advantageous in various metal machining processes. However, certain metal removing processes, such as deburring and edge contouring, or the need for great accuracy in other processes require very sensitive control of the cutting force. Simple robot path programming is insufficient to provide the accuracy required for some metal removal processes. If the normal force between a deburring tool and workpiece exceeds a given level, rapid tool breakdown occurs and workpiece damage may result. On the other hand, if the normal force is too low, the tool will simply rub the workpiece without removing metal.

The need for very accurate control of the cutting force is especially significant in deburring and edge contouring of the quite expensive superalloy parts found in some aircraft engines. Such parts must be machined very accurately if they are to properly function under demanding conditions in aircraft engines.

Normal forces of a few ounces have been found to generate the desired 0.015 inch edge chamfers on superalloy aircraft engine components. Under certain conditions, it has been found that the normal cutting force applied to a workpiece by a particular deburring and edge contouring tool changes about one ounce per mil depth of cut. In other words, if the deburring force is to be held within a one ounce limit, one must program the path of the robot arm upon which the deburring and edge contouring tool is mounted to follow the workpiece surface to within one mil.

There are several problems which generally prevent one from programming a robot path to within one mil in order to machine the workpiece to the desired accuracy. In particular, programming robots to within one mil tolerances is not usually practical. Further, setting up workpieces to within one mil tolerances is quite costly. Even if these problems can be overcome, the robot motion is not a continuum. Instead, the robot motion is a series of incremental steps, which steps are often five mils or other increments larger than one mil. If the incremental steps are five mils, the open loop cutting force would vary an unacceptable five ounces.

Although feedback arrangements might be used in order to sense the normal force and control an actuator to maintain the force within prescribed limits, such feedback loop arrangements would require that the tool force sensor be connected to control a high precision actuator. Additionally, such an arrangement would have to have a fast response time and high positioning resolution. While such a device might compensate for a range of setup and robot path tolerance errors as well as the stepwise nature of the robot's motion, such an active (i.e., feedback) arrangement is relatively complex and expensive.

OBJECTS AND SUMMARY OF THE INVENTION

Accordingly, it is a primary object of the present invention to provide a new and improved robotic device for metal removal from a workpiece.

A more specific object of the present invention is to provide a robotic deburring and edge contouring device which minimizes or prevents inaccuracy due to robot path errors, part or workpiece setup errors and robot stepwise motion effects.

Another object of the present invention is to provide a robotic deburring and edge contouring device which maintains very precise control of applied cutting force.

A further object of the present invention is to provide a robotic deburring and edge contouring device which is relatively simple and inexpensive to produce.

Yet another object of the present invention is to provide a robotic deburring and edge contouring device having easily adjustable limits of travel.

A further object of the present invention is to provide a robotic device for metal removal which is very accurate.

A still further object of the present invention is to provide an auxiliary actuation arrangement to compensate for robot path errors, part setup errors, and robot stepwise motion effects.

The above and other objects of the present invention are realized by a robotic device having a metal removal or deburring tool which is mounted to a robot arm by way of a low friction movable bearing slide. (A movable bearing slide is used herein to refer to a slide having roller bearings or ball bearings between a moving portion of the slide and a fixed portion of the slide to minimize friction.) The device includes a passive driver which may move the moving portion of the slide relative to the fixed portion of the slide between two limits of travel while maintaining minimal variation in the force with which the deburring tool is applied against the workpiece. The passive driver is an air cylinder and piston which is driven by way of an accumulator. The accumulator has a much larger volume than the air cylinder so that air pressure in the cylinder remains relatively constant with movement of the piston relative to the air cylinder.

The driver has a sufficiently low spring rate that it is operable to maintain the tool against the workpiece with a force which varies less than 10% between the two limits of travel. The drive is further operable to automatically move the deburring tool relative to the robot arm in order to compensate for errors in the relative positioning of the workpiece and the robot arm over a range corresponding to the distance between the two limits of travel. The driver has a sufficiently low spring rate such that the spring rate variation (i.e., variation due to the spring rate not including frictional effects of the slide to which the drive is connected) in its output force is less than 2% between the two limits of travel. Moreover, the driver has a sufficiently low spring rate that it is operable to maintain the deburring tool against the workpiece with a force which varies less than 5% between the two limits of travel. An adjustment feature allows one to change the two limits of travel.

BRIEF DESCRIPTION OF THE DRAWINGS

The above and other features of the present invention and the attendant advantages will be more readily understood when the following detailed description of the preferred embodiments of the present invention is considered in conjunction with the accompanying drawings wherein like characters represent like parts throughout the several views and in which:

FIG. 4 shows a simplified top view of an adjustable bracket used with the present invention.

DETAILED DESCRIPTION

Figure 1:
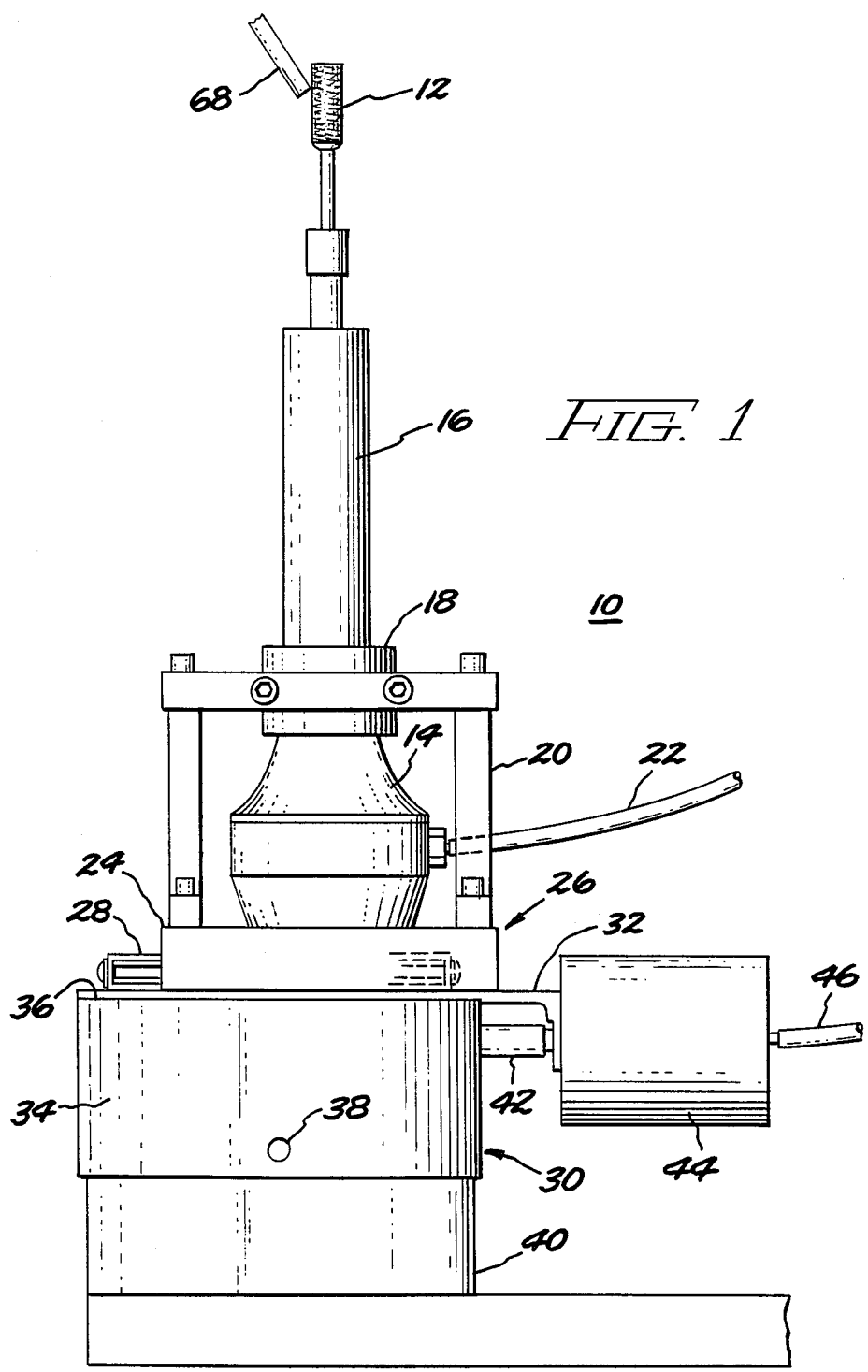
FIG. 1 shows a side view of an embodiment of the present invention.

The robotic device 10 of the present invention includes a deburring and edge contouring tool 12 which is rotated by air motor 14 by way of spindle 16 as best shown in FIG. 1. The spindle 16 rotates within a collar 18 which is secured to frame 20.

The air motor 14, which receives air from supply line 22, and the frame 20 are bolted or otherwise secured to a movable portion 24 of slide 26. The slide 26 also includes a fixed portion 28. The slide 26 is an ultra-low friction movable bearing slide having rollable bearings such that the moving portion 24 may be slid relative to the fixed portion 28 with very little friction. In particular, the rollable bearings are rollers or, preferably, ball bearings.

Figure 2:
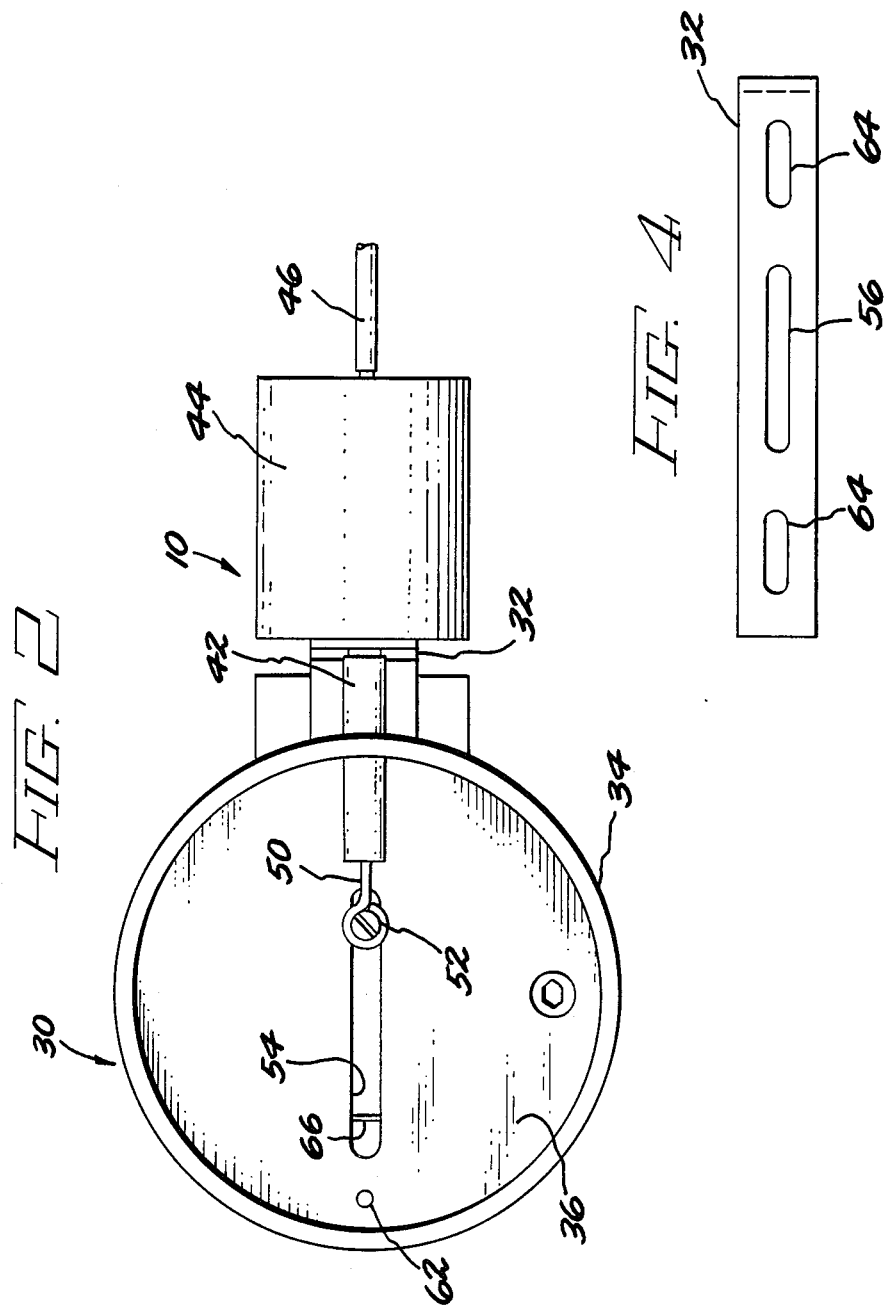
FIG. 2 shows a bottom view of the robotic device of the present invention.

Continuing to view FIG. 1, but also considering the bottom view of FIG. 2, the fixed portion 28 of slide 26 is secured to a mounting interface 30 with a bracket 32 disposed therebetween. The mounting interface 30 may include a cylindrical portion 34 fixed to a generally planar base portion 36. The cylindrical portion 34 may include a series of holes such as hole 38 (FIG. 1 only) which may be used to bolt the mounting interface 30 to a robot arm 40 of FIG. 1. The robot arm 40 may for example be secured to the mounting interface 30 by way of four bolts (not shown) extending through four holes 38 (only one shown) circumferentially spaced at 90° intervals around the cylindrical portion 34.

Mounted to the bracket 32 and mounting interface 30 is an air cylinder 42. Additionally, an accumulator 44 is mounted to the bracket 32 and receives air from accumulator air supply line 46.

Figure 3:
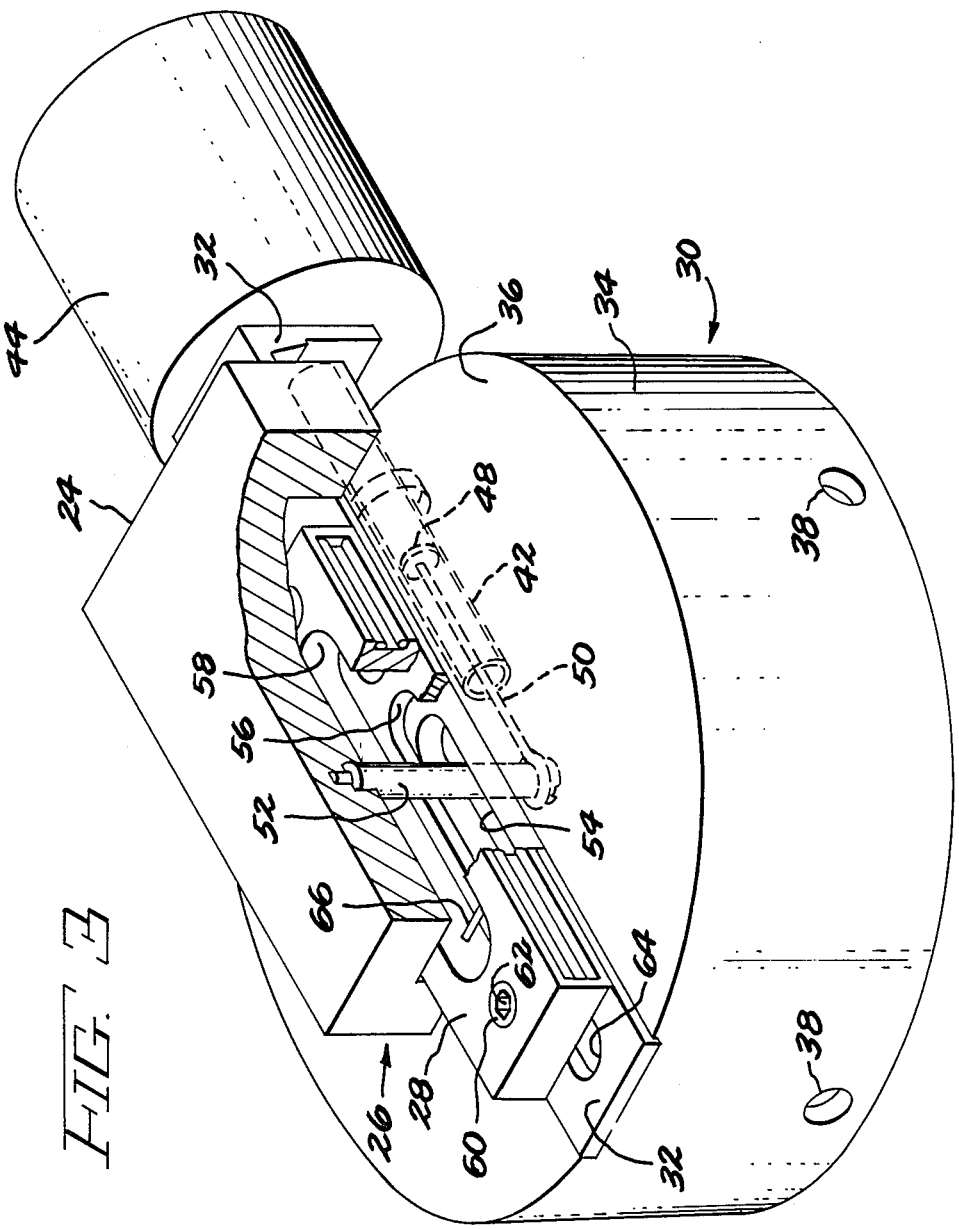
FIG. 3 shows a perspective view of the air cylinder, accumulator, and slide arrangement used with the present invention.

As shown by the views in FIGS. 2 and 3, the pressurized air supplied to accumulator 44 proceeds into air cylinder 42 such that it presses against a piston 48 disposed therein. Extending from the piston 48 is a rod 50 which is secured to a drag link 52. The drag link 52 extends through a slot 54 in mounting interface 30, a slot 56 in bracket 32, and a slot 58 in fixed portion 28 of slide 26. As shown in FIGS. 2 and 3, the fixed portion 28 includes holes 60 into which bolts 62 may extend to secure the fixed portion 28 to the base portion 36 of interface 30.

With reference to the top view of bracket 32 in FIG. 4, it will be seen that the bracket 32 includes two slots 64 which allow the bolts or screws such as 62 to extend through the bracket 32 into the holes 60. Additionally, the bracket 32 includes the drag link slot 56.

As shown in FIG. 3, the drag link's upper end is secured to the movable portion 24 of slide 26 such that movable portion 24 will move upon movement of the piston 48 over a stroke distance within air cylinder 42. The piston 48 moves between two travel limits which are reached when the drag link 52 hits either pin 66 near one end of slot 54 or the other end of slot 54.

By using the slots 64 of bracket 32, bolts such as 62 may be used to secure the bracket 32 at different locations relative to the mounting interface 30. In other words, the bolts or screws 62 may be loosened and the bracket 32 may be slid relative to the mounting interface 30. This in turn would change the position of the air cylinder 42, which is mounted to bracket 32, relative to the mounting interface 30. Accordingly, one can adjust the limits of travel of piston 48 defined by the positions at which the drag link 52 will hit the pin 66 in slot 54 and the other end of slot 54. Alternately, the ends of slot 56 and/or the ends of slot 54 could be used to define the limits of travel of the piston 48.

OPERATION

With primary reference to FIG. 1, the air motor 14 turns the deburring and edge contouring tool 12 as it is applied against an edge of a workpiece 68. The robot arm 40 is programmed to follow a path along an edge or other surface of workpiece 68. Pressurized air is supplied to accumulator supply line 46 from a pressure source (not shown) by way of a regulator (not shown). The pressurized air proceeds into the air cylinder 42 by way of the accumulator 44. This pressurized air pushes against piston 48, as shown in FIG. 3, which in turn moves the moving portion 24 of slide 26. As the deburring tool 12 and air motor 14 are mounted to the moving portion 24 of slide 26, the deburring tool 12 and air motor 14 will move. The sliding portion 24 of slide 26 stops moving as soon as an equilibrium is reached between the cutting force of the workpiece 68 on the deburring tool 12 (meaning the force in the direction of sliding of slide 26) and the force of the air pressure against piston 48 (the friction of slide 26 is quite low as to be negligible). The air cylinder 42 and piston 48 serve as a driver to maintain an essentially constant force (in a direction parallel to the direction of sliding) over the limits of travel defined by the driver arrangement of air cylinder 42, piston 48, and the associated slide 26.

The air cylinder 42 and piston 48 serve as a "zero spring rate" driver, meaning that a change in position of the piston 48 within air cylinder 42 has minimal effect upon the contact force between the profiler 12 and workpiece 68. Most importantly, the accumulator 44 has a substantially larger volume than the displaceable volume of the air cylinder 42 (i.e., the volume change over the travel of the piston between opposite ends). For example, the preferred embodiment would use an accumulator 44 having a volume of 100 times the displaceable volume of the air cylinder. The preferred embodiment has a travel of 1 and ¼ inch and the force variations for that travel can change at most 1% because of the relative volumes of the air cylinder 42 and accumulator 44. The precision air pressure regulator (not shown) which would control the pressure in the accumulator and air cylinder generally does not allow back flow of excess pressure. Accordingly, when the piston 48 (FIG. 3) moves rightwardly, this may slightly increase the pressure within the air cylinder 42 and accumulator 44. However, the accumulator 44 insures that any such increase in pressure will be extremely small.

For a preferred embodiment, the piston 48 has a piston area of 0.036 square inches. If the accumulator and air cylinder are supplied with pressure at 10 pounds per square inch, the tool actuation force will be 0.036 square inches times 10 pounds per square inch times 16 ounces per pound and is equal to 5.75 ounces. Again considering that the volume of the accumulator is 100 times the displaceable volume of the air cylinder, the activation force of 5.75 ounces would vary 1% due to the spring rate variation in the driver arrangement. (The spring rate variation in the actuation force would be that variation due to the fact that the spring rate is not exactly zero.) The actuation force may also have a very low variance due to the friction between the movable portion 24 and fixed portion 28 of the slide 26. By using an ultralow friction ball slide 26, one can avoid having the friction introduced significant variations in the force in which the deburring tool 12 is applied to the workpiece 68. The friction will preferably be less than 5% of the driver's normal operating force.

It will therefore be appreciated that the preferred embodiment having a travel of 1 and ¼ inches will allow movement over this range without affecting the normal metal removal force. Therefore, the arrangement can compensate for combined workpiece setup and robot path errors up to this distance. Additionally, one can isolate the stepwise motion of the robot arm 40 from the tool 12.

If desired, one could mount the mounting piece 30 to the robot arm by way of an end actuator in which case the air cylinder arrangement of the present invention would be used as an auxiliary actuator to supplement movements of the deburring tool 12 caused by the end actuator.

Although specific constructions have been described herein, it is to be understood that these are for illustrative purposes only. Various modifications and adaptations will be readily apparent to those of skill in the art. Accordingly, the scope of the present invention should be determined by reference to the claims appended hereto.

What is claimed is:

1. A robotic device comprising:
   a robotic arm;
   a deburring tool for deburring or edge contouring a workpiece by frictional engagement with a surface of the workpiece;
   a motor operably connected to rotate said deburring tool;
   a low friction movable bearing slide having a moving portion and a fixed portion, said motor and said deburring tool being secured to said moving portion of said slide, said fixed portion being secured to said robot arm; and
   a driver operably connected for moving said moving portion of said slide relative to said fixed portion between two limits of travel, said driver being passive and having a sufficiently low spring rate such that it is operable to maintain said deburring tool against the workpiece with a cutting force which varies less than 10% between said two limits of travel, said driver operable to automatically move said deburring tool relative to said robot arm in order to compensate for errors in the relative positioning of the workpiece and the robot arm over a range corresponding to the distance between said two limits of travel, and wherein said driver is a pressurized fluid cylinder with a piston disposed for movement over a stroke distance therein to define a displaceable volume; and
   an accumulator communicating with said fluid cylinder, said accumulator having at least 20 times the displaceable volume of said cylinder such that the combined volume of said cylinder and said accumulator changes only slightly with changes in the position of the piston within the cylinder.

2. The robotic device of claim 1 wherein said accumulator has at least 90 times the displaceable volume of said cylinder.

3. The robotic device of claim 1 wherein the slide is constructed and arranged such that the friction between said moving portion of said slide and said fixed portion of said slide is less than 5% of the normal operating load of said cylinder.

4. The robotic device of claim 1 further comprising a mounting interface having said fixed portion of said slide secured thereto and a bracket having a plurality of slots therein, said bracket secured between said fixed portion of said slide and said mounting interface, said slots allowing the adjustment of said bracket relative to said mounting interface so as to change said two limits of travel.

5. A robotic device comprising:
   a metal removal tool for removing metal from a workpiece by frictional engagement therewith;
   a motor operably connected to rotate said metal removal tool;
   a slide having a moving portion and a fixed portion, said motor and said metal removal tool being secured to said moving portion of said slide, said fixed portion adapted to be securable to a robot arm;
   an air cylinder with a piston disposed for movement between limits of travel therein, said air cylinder and piston connected as a passive driver to said moving portion of said slide and adapted to position said moving portion of said slide relative to said fixed portion of said slide; and
   an accumulator communicating with said air cylinder, said accumulator having at least 10 times the displaced volume of said air cylinder such that air pressure in said air cylinder is substantially independent of the movement of said piston relative to said air cylinder;
   wherein said robotic device is operable to maintain said metal removal tool against the workpiece with a substantially constant force independent of variations of the relative positions of the workpiece and robot arm within a range corresponding to movement of said piston between said limits of travel.

6. The robotic device of claim 5 wherein said accumulator has at least 90 times the displaced volume of said air cylinder.

7. The robotic device of claim 5 wherein said accumulator has at least 20 times the displaced volume of said air cylinder.

8. The robotic device of claim 7 wherein said slide is a low friction movable bearing slide.

9. The robotic device of claim 8 wherein said slide is a ball slide.

10. The robotic device of claim 8 wherein said air cylinder and said piston are operable to maintain said metal removal tool against the workpiece with a force which varies less than 10% with movement of said piston relative to said air cylinder between said limits of travel.

11. The robotic device of claim 10 wherein said metal removal tool is a deburring tool for deburring or edge contouring of the workpiece.

12. The robotic device of claim 11 wherein said air cylinder and said piston are operable to maintain said metal removal tool against the workpiece with a force which varies less than 10% with movement of said piston between the limits of travel relative to said air cylinder.

13. The robotic device of claim 12 wherein friction between said moving portion of said slide and said fixed portion of said slide is less than 5% of the normal operating load of said air cylinder.

14. The robotic device of claim 11 wherein said fixed portion of said slide is secured to said robot arm, and said air cylinder and piston are operable to automatically move said deburring tool relative to said robot arm in order to compensate for errors in the relative positioning of the workpiece and the robot arm over a range corresponding to the distance between said limits of travel.

15. The robotic device of claim 14 wherein said air cylinder and said piston have a sufficiently low spring rate such that the spring rate variation in their output force is less than 2% over the distance between the limits of travel.

* * * * *